Dec. 12, 1933.  G. JENDRASSIK  1,939,350
INTERNAL COMBUSTION ENGINE
Filed Aug. 12, 1925  2 Sheets-Sheet 1
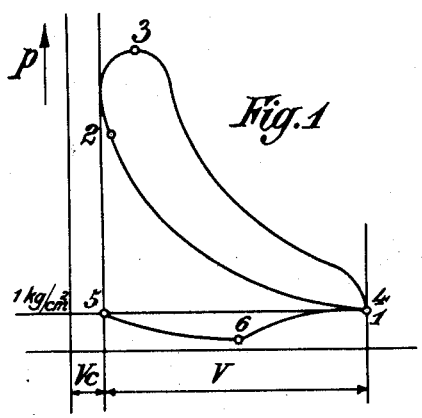
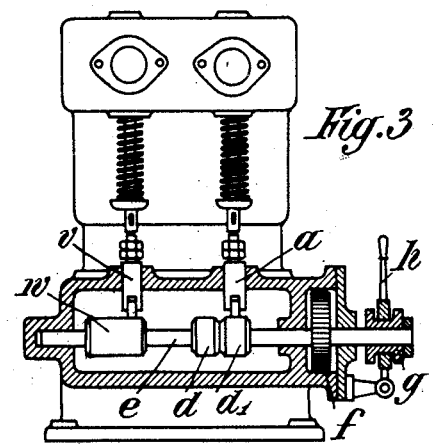
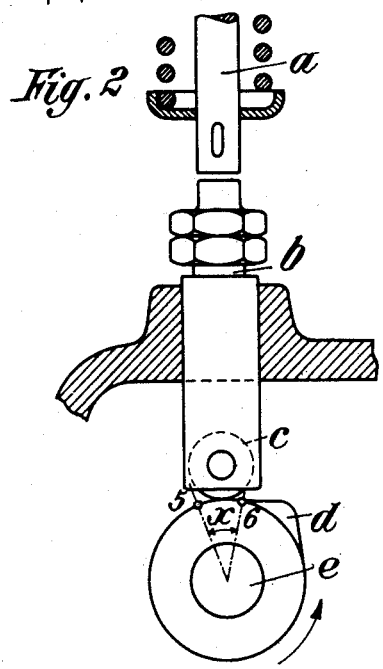
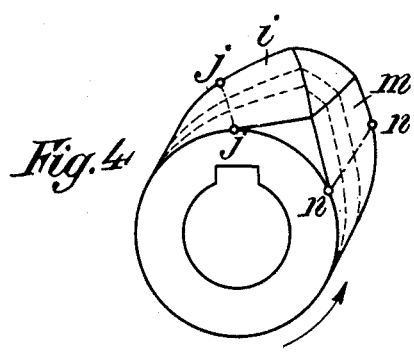
Inventor:
George Jendrassik
by
Larson, Parry, Card & Larson
Att'ys

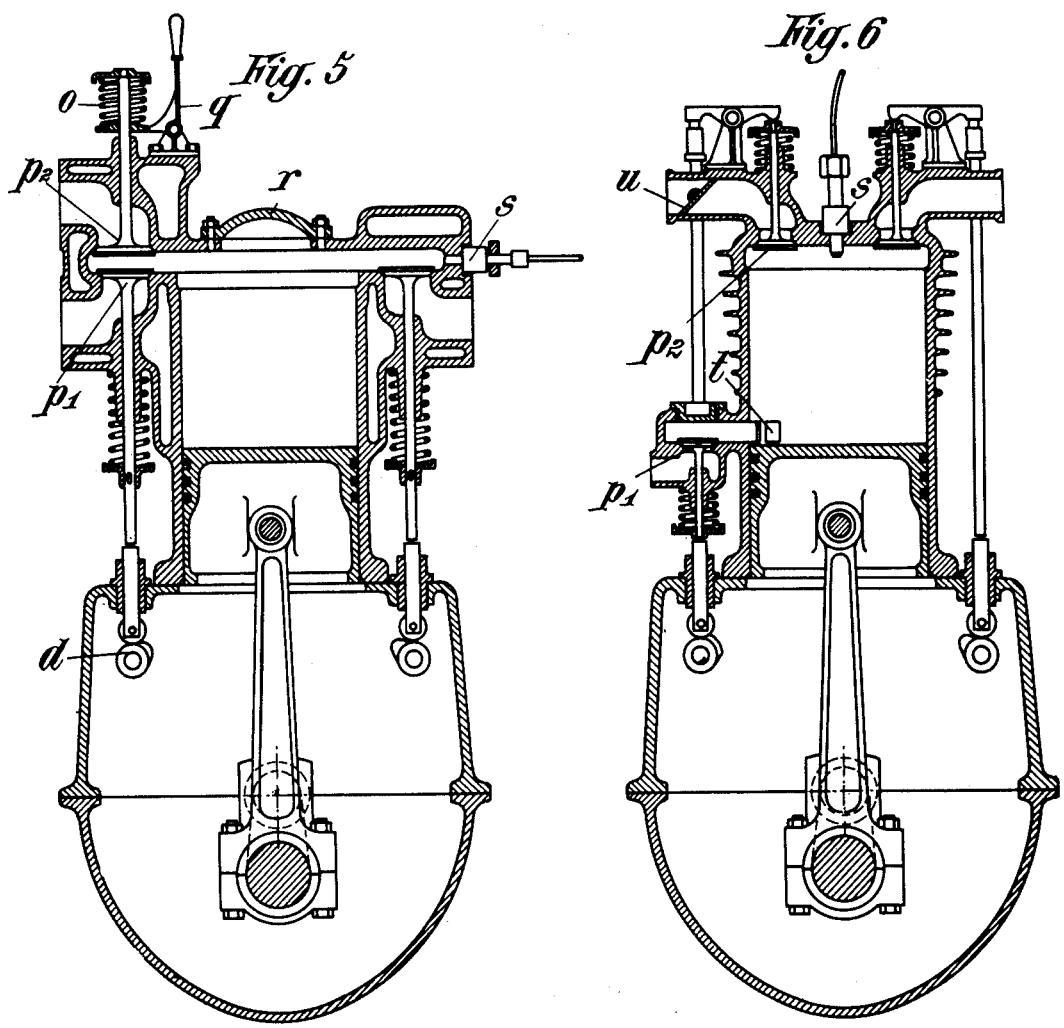

Patented Dec. 12, 1933

1,939,350

UNITED STATES PATENT OFFICE 1,939,350

INTERNAL COMBUSTION ENGINE

George Jendrassik, Budapest, Hungary

Application August 12, 1925, Serial No. 49,803, and in Hungary September 9, 1924

17 Claims. (Cl. 123—1)

The invention relates to a method of starting or running continuously internal combustion engines in which an aircharge or a mixture-charge is compressed until the ignition of the fuel takes place. The object of the invention is to effect an automatic rise of the temperature of the charge (air-charge or mixture-charge) flowing into the cylinder by shutting off either partly or completely the inlet passage during the first part of the suction stroke and opening said passage during the other part of the suction stroke up to its full sectional area, resulting in an increase in the rate of flow of the inflowing air-charge or the mixture-charge. The invention utilizes the known phenomenon that when outer air is flowing into a vessel exhausted practically totally or only partially, and within which the temperature is the same as the outer temperature, then the temperature rises considerably while the equalization of the pressures is taking place. The same phenomenon is observed when a mixture charge enters from a vessel within which the temperature is the same as that outside of it. The rise of temperature attains its maximum value when the vessel, prior to the flowing of air into it, has been practically completely exhausted of air. This phenomenon has been examined scientifically for the first time by Profesor Dr. Zeuner in his work "Technische Thermodynamik" (Technical Thermodynamics,) 2 edition, 36, page 177 a. f. o. As has been proven at that place the temperature of the air streaming into the vessel would rise, the temperature of the outer air being assumed as 15° C. after compensation of the pressures and adiabatic heat behaviour being presupposed, to 133,08° C. This action is due to the cause that when the outer air or the mixture charge is flowing in, a strong acceleration of the flowing in air or mixture particles at the expense of the outer surroundings and, owing hereto, an increase of the kinetic energy of said particles, takes place, which energy must appear in the form of heat while the equalization of pressure is taking place.

If $T_0$ is the initial temperature and $k$ the ratio of the specific heats at constant pressure and constant volume, the temperature $T_1$ resulting after the inrush will be $k.T_0$.

If $T_0$ is 273° absolute, corresponding to 0° C., and as for air $k$ is 1,4 the resulting temperature $T_1$ will be 383° abs. or 110° C., which represents a very substantial rise of temperature.

Fig. 1 of the annexed drawings shows an example of a diagram to a distance base of a four stroke internal combustion engine according to my invention.

Fig. 2 shows a cam controlling the inlet valve with the parts co-operating therewith.

Fig. 3 is an elevation partly in section of a one-cylinder motor with a valve control gear according to my invention.

Fig. 4 is a perspective view of an adjustable cam.

Fig. 5 is a diagrammatical sectional elevation of a motor having a controlled and an automatic inlet valve.

Fig. 6 is a diagrammatical sectional elevation of a motor having a controlled inlet valve and inlet ports on the cylinder wall controlled besides by an inlet valve.

With reference to Fig. 1:

1 is the beginning of the compression stroke. 2 is the beginning of the combustion, which extends to about point 3; 4 is the end of the expansion, 4—5 is the exhaust and the expulsion period and 5—6 is the suction stroke.

At the beginning 5 of the suction stroke, the inlet means, for example, the inlet valve is not opened, so that during the outward stroke of the piston, at first the residual gases of the compression chamber will perform their expansion and the pressure will drop below atmospheric pressure, producing a strong depression in the cylinder, as shown by the section 5—6 of the diagram. In point 6 the inlet means, for example, the inlet valve will be opened and the air rushing into the cylinder will produce according to the phenomenon above referred to, a rise of temperature of the gases contained in the cylinder. The further part of the suction stroke, as well as the further strokes, will be normal. The temperature of the air retained in the cylinder has been raised before the beginning of the compression stroke, by the late opening of the inlet valve, so that the compression of this air will produce finally the desired temperature for the ignition and combustion of the fuel. The fuel may be injected into the cylinder either at the end or at the beginning of the compression, or even during the suction stroke, or when using light fuels may be introduced by carburation. It will be seen, that the working process of the internal combustion engine according to my invention differs from that one of normally operated engines only as far as the suction stroke is concerned.

Fig. 2 shows as an example the cam controlling the inlet valve for the performance of the opening.

$a$ is the stem of the inlet valve and $b$ is the follower ended by a roller c co-operating with the cam d mounted on the cam shaft e of the motor revolving in the direction of the arrow. Cam d is designed in a manner that the radius 6 corresponding to the beginning of the opening of the inlet valve lags with respect to the radius 5 corresponding to the upper dead centre by the angle $x$ shown in Fig. 2. Hence the inlet valve will be opened not before point 6 of Fig. 1.

The late opening of the inlet valve might be necessary only during the starting period of the motor, while if the cylinder is hot, the rise of temperature due to compression might be sufficient to produce the ignition. In such case the cam controlling the inlet valve can be adjustable.

Fig. 3 shows diagrammatically an elevation partly in section of a one cylinder internal combustion motor with adjustable cams controlling the inlet valve.

With reference to Fig. 3 e is the cam shaft. $a$ and $v$ are the stems of the inlet and exhaust valves respectively. Cam $w$ controls the exhaust valve $v$. $d$ and $d_1$ are two cams alternatively controlling inlet valve stem $a$. Cam $d_1$ is designed to open the inlet valve as usual at the beginning of the suction stroke and to close it in the usual manner. Cam $d$ is designed as shown in Fig. 2 to open the inlet valve after a certain period past the upper dead centre of the motor piston. Pinion $f$ is mounted on the cam shaft $e$ allowing to shift this latter axially by means of a collared sleeve $g$ and lever $h$. For starting the motor cam shaft $e$ will be shifted by means of lever $h$ to the right so that cam $d$ will co-operate with the follower of valve stem $a$ to control the suction valve. The cam $w$ has such an axial length as not to come out of line with the follower $v$ of the exhaust valve even in the shifted position of the cam shaft $e$, when cam $d$ actuates the suction valve. When the motor is running the cam shaft will be returned in the position shown in Fig. 3 in which the regular $d_1$ controls the suction valve.

The cam gear of the inlet means is preferably adapted to allow to change the throttling during the suction stroke while the motor is running. Thereby the motor can be adjusted to different kinds of fuel.

Fig. 4 shows a perspective view of a control cam for the suction valve allowing this adjustment. Said cam is mounted on a cam shaft adapted to be shifted axially as described with reference to Fig. 3. The flank $l$ of positive acceleration of the cam has a shape of a helicoidal surface having a straight line for generatrix and the line $j$—$j$ corresponding to the different beginning of the period of opening of the inlet valve is a helical line. The flank $m$ of negative acceleration of the cam is plane and the line $n$—$n$ corresponds to the end of the closing period of the inlet valve. The dotted lines show different cross sections of the cam, according to planes perpendicular to the cam shaft. By shifting the cam shaft axially more or less, the follower of the inlet valve may be brought to co-operate with any cross section of the cam and will cross the line $j$—$j$ at different points corresponding to different periods of lagging of the opening of the inlet valve past the bottom dead centre of the piston.

The depression produced at the beginning of the suction stroke can be attained also by opening the inlet valve only partly during the first part of the outward stroke of the piston, it being essential to open the inlet valve completely in the vicinity of the outward dead centre to cause the cylinder to be completely charged with air.

An inlet valve provided with a heavy spring load can be used, which will open automatically only with a small lift, while a cam gear will open the inlet valve completely at the end of the suction stroke.

The throttling at the beginning of the suction stroke make be produced also by providing two inlet valves $p_1$ and $p_2$ as shown in Fig. 5, the one valve $p_1$ being controlled by cam $d$, the other valve $p_2$ being automatic. Cam $d$ controlling inlet valve $p_1$ is designed according to Fig. 2 in order to open said valve after a considerable period past the bottom dead centre. The automatic valve $p_2$ is pressed by means of a spring $o$ upon its seat, a bell crank lever $q$ being preferably provided to vary the pressure of said spring. The device for varying the spring load may be, however, omitted.

This latter arrangement operates as follows:
If at the beginning of the suction stroke the depression in the cylinder has reached a certain value, valve $p_2$ opens automatically and the air entering through this valve, will keep said depression at a constant value until the controlled valve $p_1$ will be opened. The air rushing thereupon into the cylinder, will cause in accordance to the phenomenon above referred to a rise of pressure and of temperature.

In the example shown in Fig. 5 a non cooled part $r$ of the compression chamber, the ignition head, facilitates the self-ignition of the liquid fuel injected by means of nozzle $s$ into the compression chamber.

In small motors inlet ports $t$ (Fig. 6) may be provided on the cylinder wall opened by the piston in the vicinity of its outward dead centre at the end of the suction stroke. In this figure as well as in Figure 5 the liquid fuel injection nozzle is designated by the reference character $s$.

A controlled valve $p_1$ is provided to control the connection of ports $t$ with the atmosphere. The normal inlet valve $p_2$ is controlled too and a throttle valve $u$ similar to those used in connection with gasoline motors is provided in the induction pipe.

The operation is as follows:
At the beginning of the suction stroke a depression will be produced in the cylinder the value of which depends from the position of the throttle $u$. The depression will prevail until the piston opens the ports $t$. Valve $p_1$ is controlled as to be quite open at the end of the suction stroke, so that in the moment the ports $t$ are set free, air will rush in through valve $p_1$ into the cylinder and the pressure will reach approximatively the atmospheric, while during the working stroke valve $p_1$ is closed.

It is preferred to control inlet valve $p_2$ in a manner, that it will be closed slightly after the opening of ports $t$ in order to prevent the air entering through ports $t$ from flowing into the induction pipe. The depression produced in the cylinder at the beginning of the suction stroke can be regulated by means of the throttle $u$.

In order to facilitate the starting it is advisable to stop totally the control of inlet valve $p_2$, so that this latter will not be lifted from its seat. In this manner the greatest depression can be attained.

Ports $t$ can discharge at any point of the cylinder and not only in the vicinity of the outward dead centre. In such case, however, the channels must be controlled by the gear of valve $p_1$ and not by the piston in order to prevent the premature opening.

Owing to the strong depression produced during the suction stroke and to the subsequent inrush of the air, the temperature of the air contained in the cylinder at the beginning of the compression stroke is higher than the atmospheric, hence the volumetric efficiency of the engine would be decreased. In order to avoid such decrease, a turbo blower may be arranged in the induction pipe allowing to produce the desired super-pressure without any difficulty. In such case the depression produced at the beginning of the suction stroke, must not sink below the atmospheric pressure, it being only essential that the said pressure should be lower than the pressure produced by the turbo blower in the induction pipe.

Of course any combination of the above described arrangements may be used.

Having now fully described and ascertained my said invention and the manner in which it is to be performed, I declare, that what I claim is:

1. A mechanism for starting and continuously running internal combustion engines of the type having devices for introducing fuel into the cylinder during the compression stroke or at the beginning of the expansion stroke of the piston, comprising means creating an essential vacuum in the cylinder during the first part of the suction stroke by insufficient opening of the inlet organs, means destroying said initial vacuum before the end of the suction stroke, thereby effecting an increased inrush of the cylinder charge and in consequence a raise of temperature thereof above its temperature before the inrush, means closing the inlet organs after the suction stroke has been completed, and means compressing the thus heated charge to the point at which self-ignition takes place.

2. A mechanism for starting and continuously running internal combustion engines of the type having devices for introducing fuel into the cylinder during the compression stroke or at the beginning of the expansion stroke of the piston, comprising means creating an essential vacuum in the cylinder during the first part of the suction stroke by insufficient opening of the inlet organs, means destroying said initial vacuum by causing most of the charge to enter into the cylinder only towards the end of the suction stroke, thereby effecting an increased inrush and in consequence a raise of temperature thereof above its temperature before the inrush, means closing the inlet organs after the suction stroke has been completed, and means compressing the thus heated charge to the point at which self-ignition takes place.

3. A mechanism for starting and continuously running internal combustion engines of the type having devices for introducing fuel into the cylinder during the compression stroke or at the beginning of the expansion stroke of the piston, comprising means creating an essential vacuum in the cylinder during the first part of the suction stroke by initial throttling of the inlet, means destroying said initial vacuum by opening fully the throttled inlet, and causing most of the cylinder charge to enter said cylinder only towards the end of the suction stroke, thereby effecting an increased inrush and in consequence a raise of temperature thereof above its temperature before the inrush, means closing the inlet after the suction stroke has been completed, and means compressing the thus heated charge to the point at which self-ignition takes place.

4. A mechanism for starting and continuously running internal combustion engines of the type having devices for introducing fuel into the cylinder during the compression stroke or at the beginning of the expansion stroke of the piston, comprising means creating an essential vacuum in the cylinder during the first part of the suction stroke by initial throttling of the inlet, means destroying said initial vacuum by setting free the throttled inlet, and causing most of the cylinder charge to enter said cylinder only towards the end of the suction stroke, thereby effecting an increased inrush and in consequence a raise of temperature thereof above its temperature before the inrush, means closing the inlet after the suction stroke has been completed, means compressing the thus heated charge to the point at which self-ignition takes place, and means varying the setting free of the throttled inlet while the engine is running.

5. A mechanism for starting and continuously running internal combustion engines of the type having devices for introducing fuel into the cylinder during the compression stroke or at the beginning of the expansion stroke of the piston, comprising means creating an essential vacuum in the cylinder during the first part of the suction stroke by initial throttling of the inlet, means destroying said initial vacuum by setting free the throttled inlet before the end of the suction stroke, thereby effecting an increased inrush and in consequence a raise of temperature of the cylinder charge above the temperature of the inrushing charge portion before the inrush, means closing the inlet after the suction stroke has been completed, means compressing the thus heated charge to the point at which self-ignition takes place, and means varying the degree of said initial throttling while the engine is running.

6. A mechanism for starting and continuously running internal combustion engines of the type having devices for introducing fuel into the cylinder during the compression stroke or at the beginning of the expansion stroke of the piston, comprising means creating an essential vacuum in the cylinder during the first part of the suction stroke by initial throttling of the inlet, means destroying said initial vacuum by setting free the throttled inlet before the end of the suction stroke, thereby effecting an increased inrush and in consequence a raise of temperature of the cylinder charge above the temperature of the inrushing charge portion before the inrush, means closing the inlet after the suction stroke has been completed, means compressing the thus heated charge to the point at which self-ignition takes place, and means varying the point of the suction stroke at which said initial throttling will be destroyed while the engine is running.

7. A mechanism for starting and continuously running internal combustion engines of the type having devices for introducing fuel into the cylinder during the compression stroke or at the beginning of the expansion stroke of the piston, comprising means creating an essential vacuum in the cylinder during the first part of the suction stroke by initial throttling of the inlet, means destroying said initial vacuum by setting free the throttled inlet before the end of the suction stroke, thereby effecting an increased inrush and in consequence a raise of temperature of the cylinder charge above the temperature of the inrushing charge portion before the inrush, means closing the inlet after the suction stroke has been completed, means compressing the thus heated charge to the point at which self-ignition takes place, means varying the degree of said initial throttling and varying the point of the suction stroke at which said initial throttling will be destroyed and means for operating said varying means while the engine is running.

8. In an internal combustion engine, the combination of means for introducing the fuel into the cylinder during the compression stroke or at the beginning of the expansion stroke of the piston, an inlet valve, a cam mechanism gear having two cams thereon arranged to control selectively said inlet valve, one of said cams being timed to open said inlet valve only after the piston has completed a certain part of its suction stroke, the other cam being timed to open the inlet valve normally at the beginning of the suction stroke, and both cams closing the inlet valve at the end of the suction stroke.

9. In an internal combustion engine, the combination of means for introducing the fuel into the cylinder during the compression stroke or at the beginning of the expansion stroke of the piston, an inlet valve, a cam mechanism to control said inlet valve comprising a cam timed to open said inlet valve only after the piston has completed a certain part of its suction stroke and closing it at the end of the suction stroke, said cam having a helicoidal surface for opening the valve, each cross section of said surface corresponding to different delays in the opening of said inlet valve after the beginning of the suction stroke, and means for shifting said cam in an axial direction to bring different cross sections of said surface into operation.

10. In an internal combination engine of the type having means for introducing the fuel into the cylinder during the compression stroke or at the beginning of the expansion stroke of the piston, the combination of a cylinder and piston, intake passage ports in the wall of said cylinder controlled by said piston and being set free by said piston only near its outer dead center position, a positively controlled closing member also controlling said intake passage ports, said cylinder being provided with another intake passage opening into the compression chamber of said cylinder, and a positively controlled valve for said last named passage, and a throttling member controlling said last named passage.

11. A mechanism for starting and continuously running internal combustion engines of the type having devices for introducing fuel into the cylinder during the compression stroke or at the beginning of the expansion stroke of the piston, comprising means creating an essential vacuum in the cylinder during the first part of the suction stroke by delayed opening of the inlet organs, means destroying said initial vacuum before the end of the suction stroke, thereby effecting an increased inrush of the cylinder charge and in consequence a raise of temperature thereof above its temperature before the inrush, means closing the inlet organs after the suction stroke has been completed, and means compressing the thus heated charge to the point at which self-ignition takes place.

12. A mechanism for starting and continuously running internal combustion engines of the type having devices for introducing fuel into the cylinder during the compression stroke or at the beginning of the expansion stroke of the piston, comprising means creating an essential vacuum in the cylinder during the first part of the suction stroke by delayed opening of the inlet organs, means destroying said initial vacuum by causing most of the charge to enter into the cylinder only towards the end of the suction stroke, thereby effecting an increased inrush and in consequence a raise of temperature thereof above its temperature before the inrush, means closing the inlet organs after the suction stroke has been completed, and means compressing the thus heated charge to the point at which self-ignition takes place.

13. The method of starting and operating internal combustion engines of that type in which fuel is introduced into the cylinder during the compression stroke or at the beginning of the expansion stroke of the piston, comprising increasing the temperature of the cylinder charge by restricting the inlet opening at the beginning of the suction stroke thereby causing the increased inflowing of the air into the vacuum thus created and then compressing the thus heated cylinder charge to the self-ignition point.

14. The method of starting and operating internal combustion engines of that type in which fuel is introduced into the cylinder during the compression stroke or at the beginning of the expansion stroke of the piston, comprising increasing the temperature of the cylinder charge by delaying the opening of the inlet port thereby causing an inflowing of the air into the vacuum thus created and then compressing the thus heated cylinder charge to the point at which self-ignition takes place.

15. The method of starting and operating internal combustion engines of that type in which fuel is introduced into the cylinder during the compression stroke or at the beginning of the expansion stroke of the piston comprising increasing the temperature of the cylinder charge by an initial throttling of the incoming air during the first part of the suction stroke then diminishing such throttling so as to cause an increasing inflowing of the air and then compressing the thus heated cylinder charge to the self-ignition point.

16. The method of starting and operating an internal combustion engine of that type in which the cylinder charge is compressed to the point of self-ignition comprising increasing the temperature of the cylinder charge by an initial throttling of the incoming mixture during the first part of the suction stroke, then diminishing such throttling in order to cause an increased inflowing of the mixture and then compressing such heated cylinder charge to the self-ignition point.

17. A mechanism for starting and continuously running internal combustion engines of the type having devices for introducing fuel into the cylinder during the compression stroke or at the beginning of the expansion stroke of the piston, comprising means creating an essential vacuum in the cylinder during the first part of the suction stroke by delayed opening of the inlet organs, means varying the extension of said first part of the suction stroke while the opening of the inlet organs is delayed, means destroying said initial vacuum before the end of the suction stroke, thereby effecting an increased inrush of the cylinder charge and in consequence a raise of temperature thereof above its temperature before the inrush, means closing the inlet organs after the suction stroke has been completed, and means compressing the thus heated charge to the point at which self-ignition takes place.

GEORGE JENDRASSIK